Oct. 5, 1965  F. D. KAISER ETAL  3,210,636
ELECTRICAL CONVERTERS
Filed Oct. 9, 1961                    5 Sheets-Sheet 1
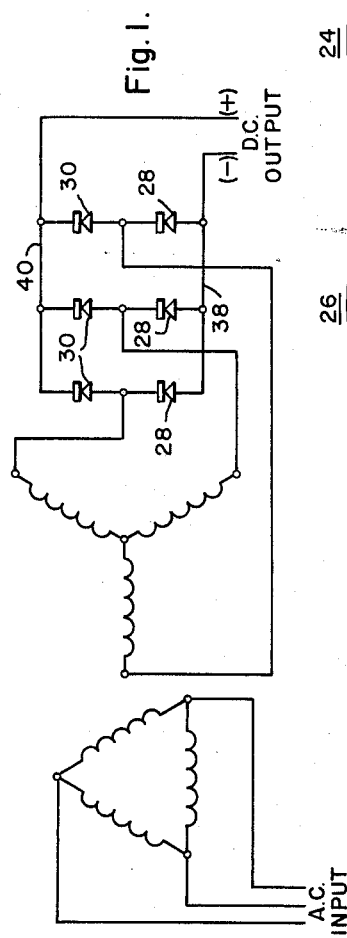
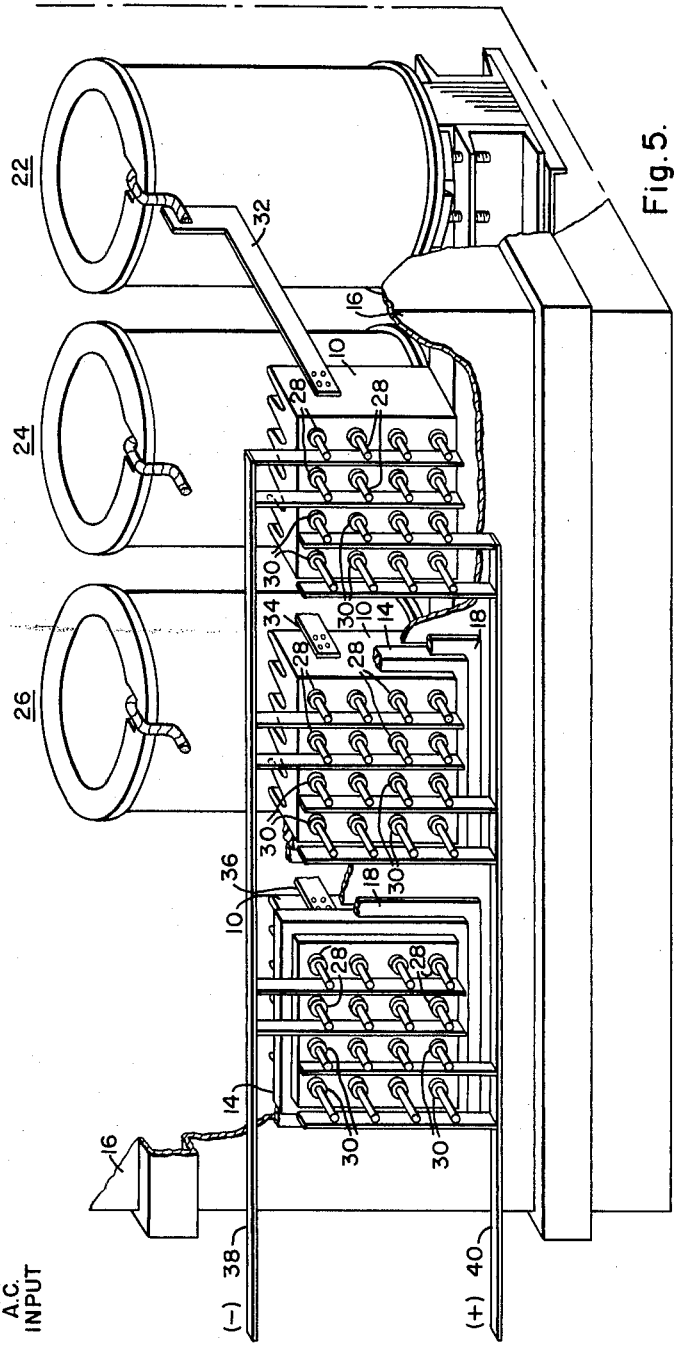
WITNESSES:
INVENTORS
Francis D. Kaiser and
Donald K. Barnes.
BY
ATTORNEY

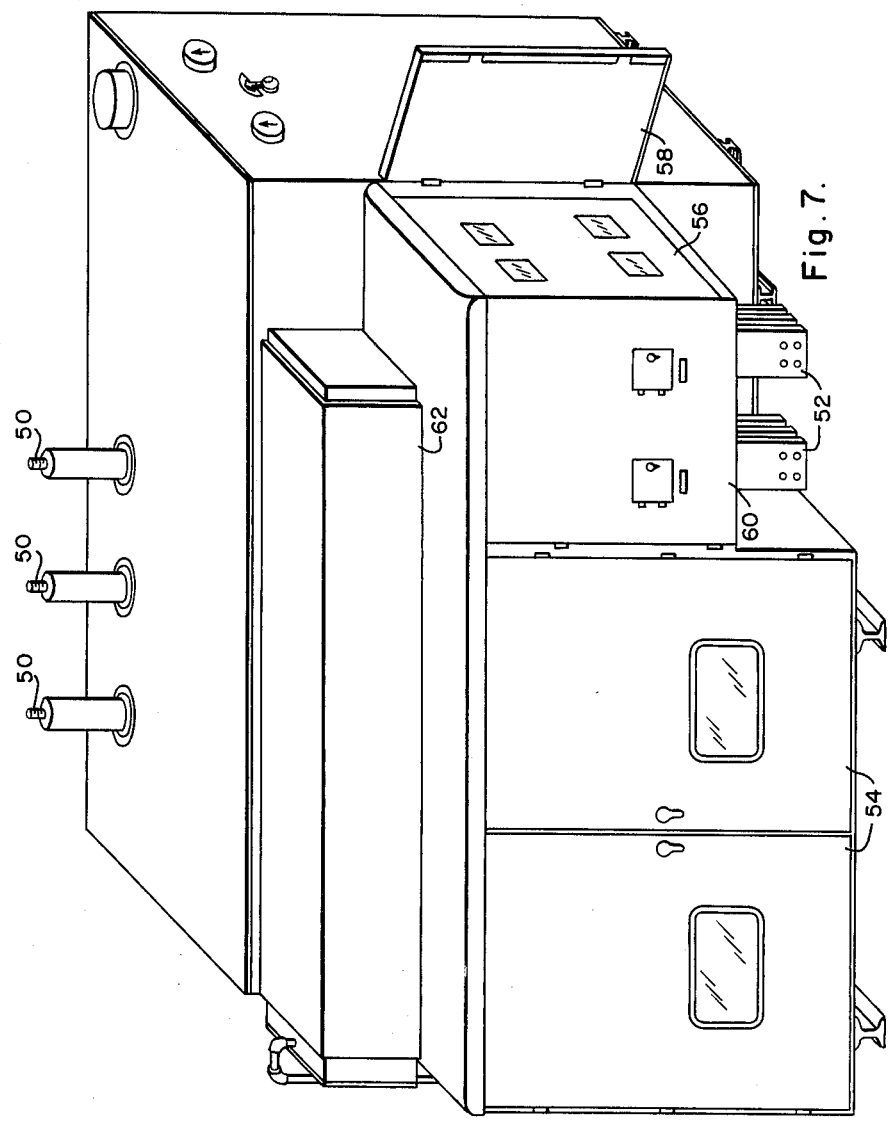

United States Patent Office 3,210,636
Patented Oct. 5, 1965

3,210,636
ELECTRICAL CONVERTERS
Francis D. Kaiser, Sharon, and Donald K. Barnes, Hickory Township, Mercer County, Pa., assignors to Westinghouse Electric Corporation, East Pittsburgh, Pa., a corporation of Pennsylvania
Filed Oct. 9, 1961, Ser. No. 143,743
7 Claims. (Cl. 321—8)

The present invention relates in general to electrical converters for converting alternating current to direct current and more particularly to self-contained transformer-rectifier apparatus.

Conventionally, transformer-rectifier apparatus comprises two separate units, a transformer and a rectifier. This requires transformer input and output bushings and terminals, rectifier input and output bars and terminals and bus bars to interconnect the two units. Also cooling means for both the transformer and the rectifier are required.

Accordingly, it is a general object of this invention to provide a new and improved transformer-rectifier apparatus.

It is a more particular object of the invention to provide a new and improved transformer-rectifier apparatus contained in one container so that both the transformer and rectifier are cooled by a common coolant.

Still another object of this invention is to provide a new and improved transformer-rectifier apparatus that requires no interconnecting bus bars and a reduced number of insulating bushings.

Briefly, the present invention accomplishes the above cited objects by mounting the rectifiers on an electrically conductive heat sink having heat dissipating means, such as fins, on one side thereof. The heat sink is then sealed into an opening in a transformer tank with the rectifier cells extending outwardly and the finned side of the heat sink extending inwardly into the tank. The transformer is then placed in the tank and electrically connected to the heat sink which is electrically insulated from the tank wall. The tank is then filled with a coolant such as transformer oil, sulphur hexafluoride (SF$_6$) or the like.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 1 is a schematic diagram of a transformer-rectifier circuit;

FIG. 5 is a partial sectional view of a front elevation of one embodiment of the invention;

FIG. 7 is a view of a completed transformer-rectifier assembly; and,

Although all of the darwings show a three phase system, it is to be understood that the invention is not to be limited to that arrangement.

The schematic diagram of FIG. 1 shows a circuit connection of the transformer and the rectifier connected in a conventional three phase bridge circuit.

Figure 2:
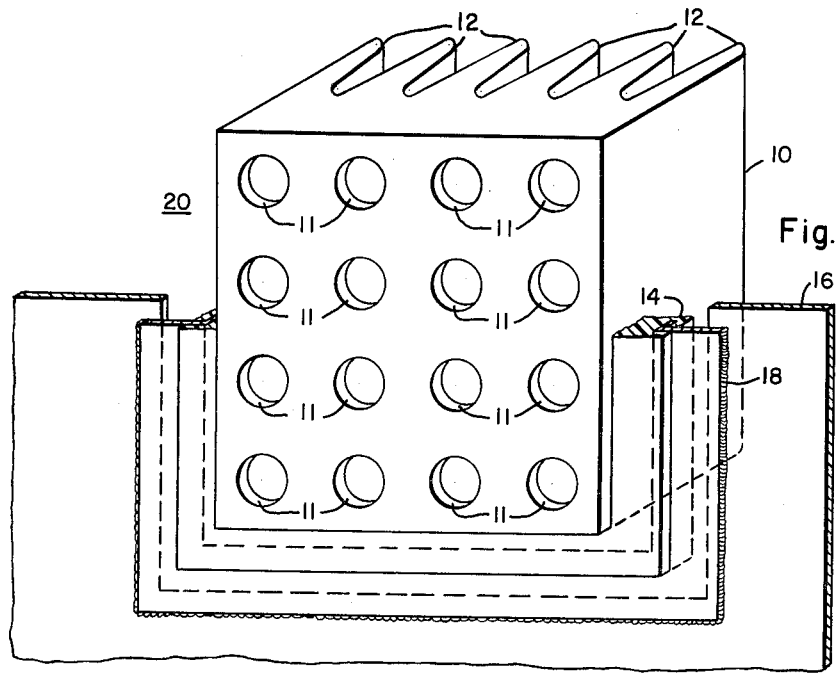
FIG. 2 shows a rectifier heat sink mounting block attached to a partially cut away tank.

FIG. 2 shows a heat sink or rectifier cell mounting block 10 with a plurality of tapped holes 11 provided to accept semiconductor rectifier diodes. The heat sink or cell mounting block 10 has fins 12 extending from the back side. A resin seal 14 is cast around the heat sink 10 to serve as a seal between the heat sink 10 and the tank wall 16 to thereby contain a coolant enclosed within the tank 16. An angle member 18 has one leg cast into the resin seal 14 with the other leg extending perpendicular to the heat sink 10 beyond the outer edge of the resin seal 14 to provide a means of fastening the rectifier assembly 20 to the transformer tank 16. The rectifier assembly 20 would be attached to the transformer tank by fastening the extending leg of the angle member 18 to the tank wall 16 by welding, bolting or the like.

Figure 3:
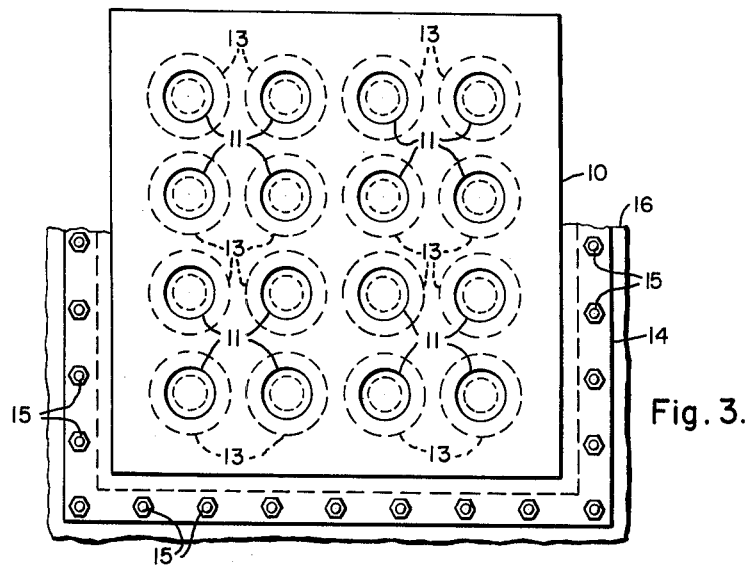
FIG. 3 is a rectifier mounting block with detachable heat radiating members thereon.
Figure 4:
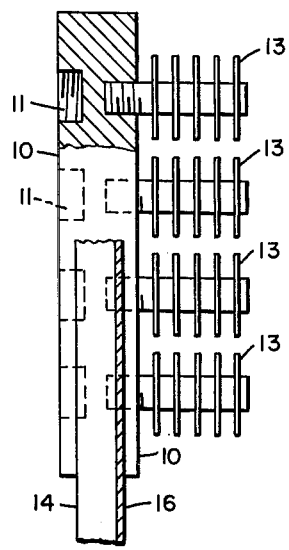
FIG. 4 is a partial sectional side view of the mounting block of FIG. 3.

The mounting block shown in FIGS. 3 and 4 is similar to that shown in FIG. 2 except the radiating members 13, shown in FIG. 4, are screwed into the block 10. With this arrangement the radiators 13 can be added or removed as required for the necessary cooling of the rectifier cells mounted on the block 10.

The mounting block shown in FIGS. 3 and 4 shows an alternate method of attaching the block 10 to the tank wall 16. That is, a plurality of studs 15 are attached to the tank wall 16 around the periphery of the hole cut out for the block 10. The resin seal 14 has holes provided therein whereby the mounting block can be bolted to the wall by the studs 15. Gaskets are placed between the seal 14 and the tank wall 16 in this arrangement to insure a good seal between them.

FIG. 5 shows a transformer-rectifier assembly with the tank wall partially cut away. The three phases of the transformer 22, 24 and 26 are each connected to a heat sink 10, by connectors 32, 34 and 36, respectively. Each heat sink has two rows of forward poled diodes 28 and two rows of reverse poled diodes 30. Forward poled diodes as the term is used in this description refers to those diodes that have their cathode electrically connected to the cell mounting stud and reverse poled diodes are those that have their anode electrically connected to the cell mounting stud. The forward poled diodes 28 have their anodes connected in a series parallel circuit arrangement to the negative direct current bus 38 and the reverse poled diodes 30 have their cathodes connected to the positive direct current bus 40.

The heat sink or cell mounting block 10 is secured to the tank 16 in the manner described above and shown in FIG. 2 or FIGS. 3 and 4. That is, by welding or bolting the extending leg of the angle member 18 to the tank wall 16 or providing holes in the resin seal 14 and studs 15 on the tank wall 16.

Figure 6:
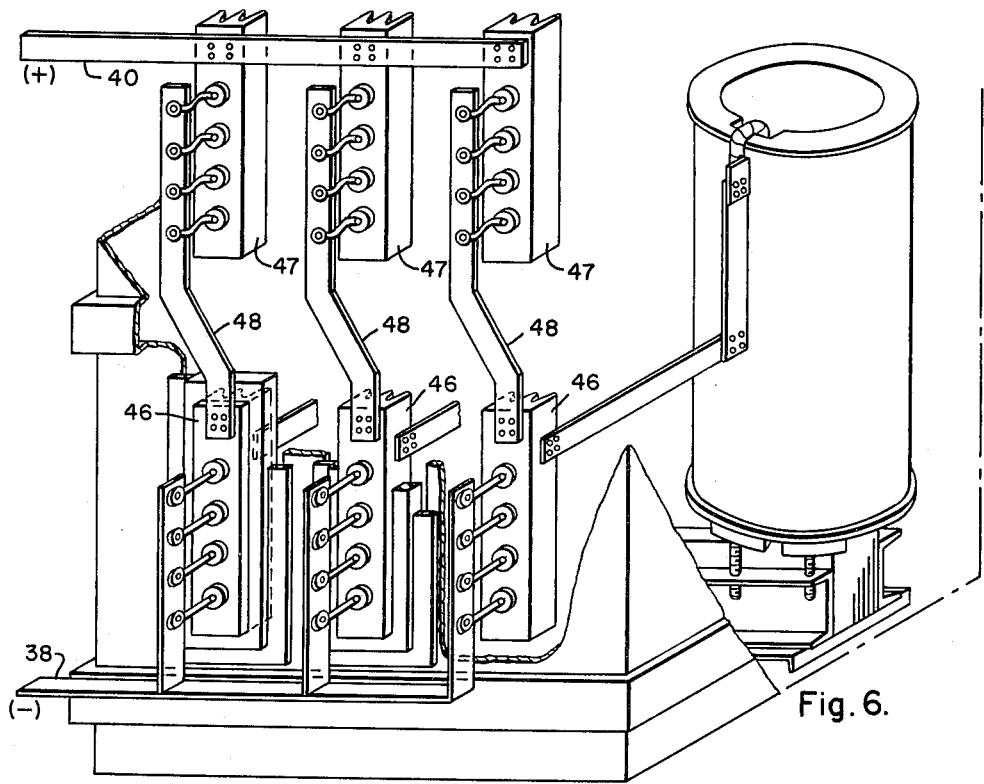
FIG. 6 is a partial sectional view of a front elevation of another embodiment of the invention.

FIG. 6 is a view of an embodiment of this invention where either, all forward poled, or all reverse poled diodes are used. This arrangement requires twice as many heat sinks or cell mounting blocks as the arrangement shown in FIG. 4. Each phase of the transformer is then connected to a heat sink 46. An interconnecting bus 48 is connected from the mounting block 46 to the anodes of the diodes mounted on another mounting block 47. This is, of course, for the case of all forward poled diodes. If reverse poled diodes are used the interconnecting bus 48 will connect mounting block 46 to the cathode of the diodes on mounting block 47 and the polarity of the direct current output buses 38 and 40 will be reversed.

FIG. 7 is a perspective view of a complete transformer-rectifier assembly installed in a cabinet. The alternating current input terminals 50 are shown extending from the top of the assembly, and the direct current output terminals 52 are shown extending from the bottom. The doors 54 swing open to give access to the rectifier cells.

A meter panel 56 is shown with a door 58 which closes to protect the meters. Another door 60 opens to expose the direct current line circuit breakers. A transformer coolant to water heat exchange 62 is provided to remove heat from the coolant used to cool the enclosed transformer and rectifier.

Figure 8:
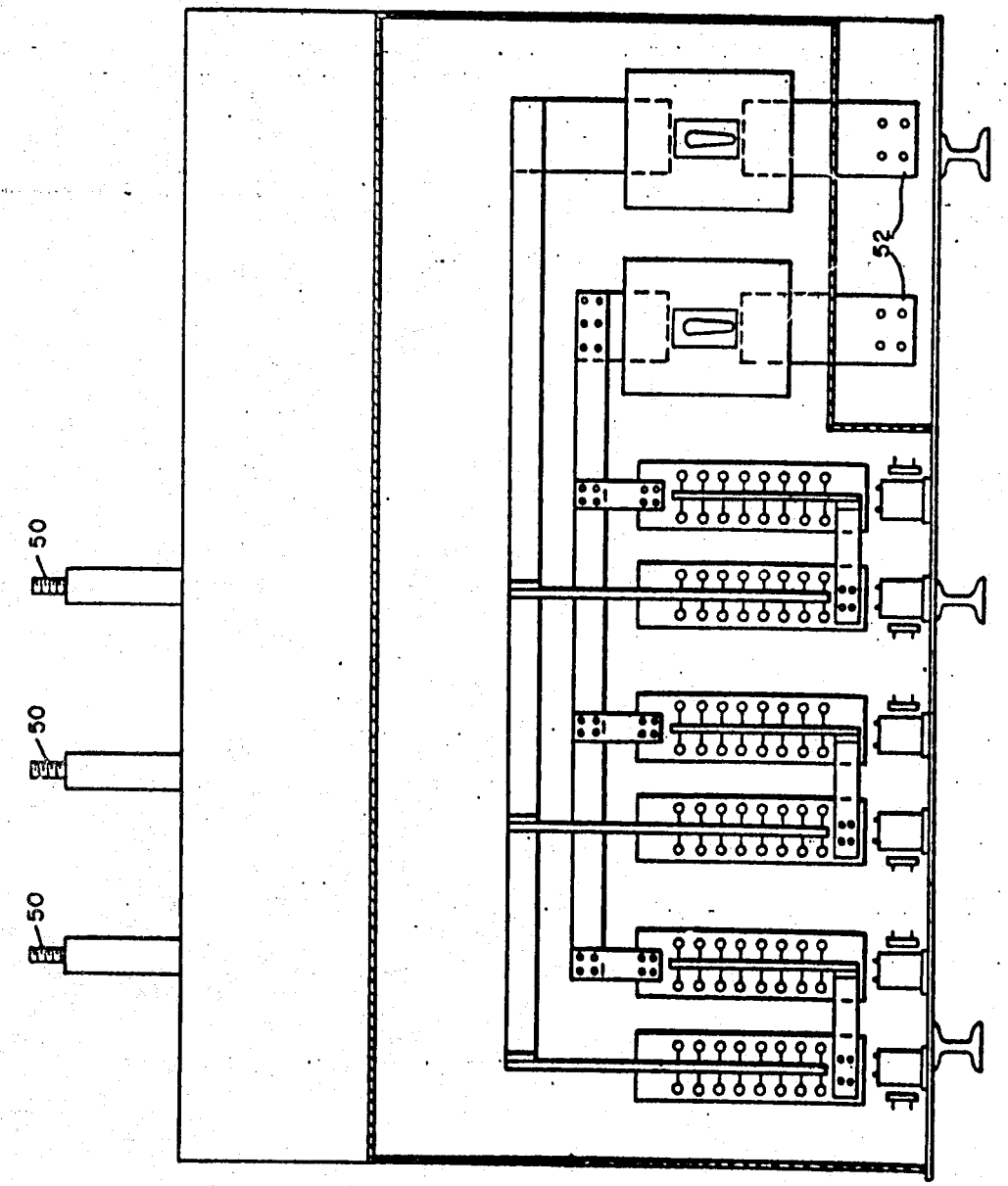
FIG. 8 shows the assembly of FIG. 7 with the rectifier cover housing removed.

FIG. 8 is a front view of the assembly of FIG. 7 with the rectifier and circuit breaker housings removed. FIG. 8 also shows a different arrangement, of the rectifier cell mounting blocks, than the arrangement shown in FIGS. 5 and 6.

While there have been shown and described what are at present considered to be the preferred embodiments of the invention, modifications thereto will readily occur to those skilled in the art. It is not desired, therefore, that the invention be limited to the specific arrangement shown and described, and it is intended to cover in the appended claims all such modifications as fall within the true spirit and scope of the invention.

What we claim as our invention is:

1. A transformer-rectifier combination comprising, a transformer, a tank having a coolant therein and an opening in a wall of the tank, said transformer being mounted in said tank and surrounded by said coolant, an electrically conductive quadrilateral mounting block having a plurality of rectifier cells mounted on one side thereof in conductive relationship and heat radiating members mounted on the opposite side, said mounting block extending through the opening in said tank with said radiating members in contact with said coolant, means electrically connecting said mounting block with said transformer, and insulating means formed around the periphery of the mounting block and attached to the exterior of the tank for supporting the block and insulating said mounting block from said tank.

2. A transformer-rectifier combination comprising, a transformer, a tank having a coolant therein and an opening in a wall of the tank, said transformer being mounted in said tank and surrounded by said coolant, a heat sink comprising a quadrilateral block of conducting material having rectifying means mounted on one side, in conductive relationship, said block being disposed in the opening in said tank and being in contact with said coolant, means electrically connecting said block to said transformer, and insulating means formed around the periphery of the block and attached to the exterior of the tank for supporting the block and electrically insulating said block from said tank.

3. A transformer-rectifier combination comprising, a transformer, a tank having a coolant therein and an opening in a wall of the tank, said transformer being mounted in said tank and being surrounded by said coolant, a heat sink comprising a quadrilateral block of conducting material having rectifying means mounted thereon in conductive relationship, a strip of insulating material cast around the periphery of said block, said heat sink extending through the opening in said tank and being in contact with said coolant with said rectifying means extending outwardly, from the heat sink, means mechanically attaching the strip of insulating material to the exterior of the tank to support the heat sink, means electrically connecting said heat sink with said transformer, and said heat sink being electrically insulated from said tank by said strip of insulating material.

4. A transformer-rectifier combination comprising, a transformer, a tank having a coolant therein and an opening in a wall of the tank, said transformer being mounted in said tank and being surrounded by said coolant, a heat sink comprising a quadrilateral block of conducting material having rectifying means mounted thereon in conductive relationship, electrical insulating material cast around the periphery of said block, a metal angle member having one portion cast in said electrical insulating material and another portion extending outwardly therefrom, said heat sink being inserted in the opening in said tank and being in contact with said coolant, said another portion of said metal angle member being mechanically fastened to the exterior of said tank to hold said heat sink in position in the opening in said tank, means electrically connecting said transformer to said heat sink, and said heat sink being electrically insulated from said tank by said electrical insulating material.

5. A transformer-rectifier combination comprising a three-phase transformer having primary and secondary windings for each phase, a tank having a coolant therein and openings in a wall of the tank, said transformer windings being mounted in the tank and surrounded by the coolant, at least one heat sink for each phase, each heat sink comprising a quadrilateral block of conducting material having a plurality of rectifiers mounted on one side in conductive relationship, said blocks being disposed in the openings in the tank and being in contact with the coolant, means electrically connecting the secondary winding for each phase to one of said blocks, and insulating means formed around the periphery of each block and attached to the exterior of the tank for supporting the block and electrically insulating the block from the tank.

6. A transformer-rectifier combination comprising a three-phase transformer having primary and secondary windings for each phase, a tank having a coolant therein and openings in a wall of the tank, said transformer windings being mounted in the tank and surrounded by the coolant, at least one heat sink for each phase, each heat sink comprising a quadrilateral block of conducting material having a plurality of forward and reverse poled rectifiers mounted on one side in conductive relationship, said blocks being disposed in the openings in the tank and being in contact with the coolant, means electrically connecting the secondary winding for each phase to one of said blocks, the forward poled rectifiers on each block being connected to a power conductor of one polarity, the reverse poled rectifiers on each block being connected to a power conductor of the opposite polarity, and insulating means cast around the periphery of each block and attached to the exterior of the tank for supporting the block and electrically insulating the block from the tank.

7. A transformer-rectifier combination comprising a three-phase transformer having primary and secondary windings for each phase, a tank having a coolant therein and openings in a wall of the tank, said transformer windings being mounted in the tank and surrounded by the coolant, at least two heat sinks for each phase, each heat sink comprising a quadrilateral block of conducting material having a plurality of either forward poled or reverse poled rectifiers mounted on one side in conductive relationship, said blocks being disposed in the openings in the tank and being in contact with the coolant, means electrically connecting the secondary winding for each phase to one of the blocks, means electrically connecting said one block for each phase to the rectifiers on the other block for the corresponding phase, said other blocks being connected to a power conductor of one polarity, the rectifiers on said one block for each phase being connected to a power conductor of the opposite polarity, and insulating means sealed to the periphery of each block and attached to the exterior of the tank for supporting the block and electrically insulating the block from the tank.

References Cited by the Examiner
UNITED STATES PATENTS

| | | | |
|---|---|---|---|
| 1,874,478 | 8/32 | Fayer | 174—15.2 |
| 2,942,165 | 6/60 | Jackson et al. | 317—234 |
| 2,979,644 | 4/61 | Salzer | 317—234 |
| 3,068,391 | 12/62 | Kliesch | 321—8 |

LLOYD McCOLLUM, *Primary Examiner.*